United States Patent [19]

Purdy et al.

[11] Patent Number: 5,704,692
[45] Date of Patent: Jan. 6, 1998

[54] METHOD OF WELDING A SENSOR BRACKET TO AN AXLE

[75] Inventors: Michael W. Purdy, Dunkirk; Charles W. Carles, Kenton, both of Ohio

[73] Assignee: Rockwell Heavy Vehicles Systems, Inc.

[21] Appl. No.: 509,787

[22] Filed: Aug. 1, 1995

[51] Int. Cl.⁶ .................................................. B60T 8/32
[52] U.S. Cl. ............... 301/105.1; 324/173; 324/207.22; 219/137 R; 188/181 R; 384/448
[58] Field of Search .................... 301/6.1, 105.1, 301/124.1; 280/432; 73/5, 488, 493, 494; 324/173, 174, 207.22; 188/181 R; 384/446, 448; 219/137 R

[56] References Cited

U.S. PATENT DOCUMENTS

| | | | |
|---|---|---|---|
| 2,452,574 | 11/1948 | Jones | 219/61 |
| 4,132,293 | 1/1979 | Jovick | 188/181 R |
| 5,067,597 | 11/1991 | Young | 188/181 R |

*Primary Examiner*—Russell D. Stormer

[57] ABSTRACT

A sensor bracket for mounting an anti-lock braking sensor is welded to an axle with a welding method that causes a portion of a bracket preform to be consumed to form the weld joint. In one preferred embodiment, an outer end of a stem of the bracket is formed of a material that will be made molten by an arc between the bracket and the axle. A fluxing agent is preferably mounted on an extreme end of the stem to initially ignite and clean the area on the axle, and further insure that the other portions of the bracket will become molten. The method preferably includes supplying a current through the bracket preform and bringing the bracket preform towards the axle. The axle is grounded, and as the bracket preform is brought adjacent to the axle, an arc is formed between the two. Outer portions of the bracket preform thus become molten. A fixture for mounting the bracket preform continues to bring the bracket preform towards the axle for a predetermined period of time. After predetermined period of time, the current is disconnected. The bracket fixture continues to hold the bracket against the axle such that the weld joint may solidify. The inventive use of a welding method in which the bracket preform is consumed to secure the bracket preform to the axle provides for a secure connection. Moreover, this welding method allows the use of automated assembly techniques to secure the sensor bracket to the axle.

11 Claims, 1 Drawing Sheet

METHOD OF WELDING A SENSOR BRACKET TO AN AXLE

BACKGROUND OF THE INVENTION

This invention relates to a method of welding a sensor bracket to an axle using a welding technique that consumes a portion of the bracket.

Sensor brackets are typically mounted to axles in the prior art. The sensor brackets mount a sensor that monitors rotation of a wheel, and communicates with an anti-lock braking system. Sensor brackets have typically been welded to the axles utilizing hand welding techniques. A weld rod is positioned adjacent to the interface of the bracket and the axle. The weld rod is consumed to form the welded joint.

Moreover, the brackets are typically mounted to frusto-conical portions of the axle. It is somewhat difficult to ensure the weld material is uniformly distributed to form a secure connection.

There are typically brackets mounted at each end of each axle in a vehicle which carries an anti-lock braking system. As such, there are a relatively large number of brackets which must be connected to the axles. The requirement of manual welding has increased the labor associated with securing the sensor brackets to the axles.

SUMMARY OF THE INVENTION

In a disclosed embodiment of this invention, a bracket is welded to an axle utilizing a welding technique in which the bracket body itself is consumed to form the weld joint. In this way, an automatic fixture may be utilized to perform the welding. As such, the labor required to complete the connection of the brackets to the axle is greatly reduced. Moreover, the joint formed between the bracket and the axle is a strong weld joint that resists fracture and easily conforms to the surface of the axle.

In a preferred embodiment of this invention, the bracket includes a barrel portion for holding the sensor, and a stem or leg portion which is welded to the axle. In one preferred embodiment, the stem includes a portion that is to be consumed to form the weld material at an end remote from the barrel. A current is applied to the bracket, and the axle is grounded. A fixture holds the bracket such that the barrel bore is parallel to the axis where the sensor is to be mounted. The fixture then moves the bracket downwardly towards the axle. As the charged bracket approaches the axle, an arc is formed between the two, and the bracket material becomes molten.

As the material becomes molten, the fixture continues to move the bracket into contact with the axle. The movement of the bracket towards the axle with application of current is maintained for a predetermined period of time, that is typically on the order of only a few seconds. After the time period ends, the current is disconnected. After the current is disconnected, the fixture continues to hold the bracket into contact with the axle. This allows the weld material to begin to solidify and secure the bracket to the axle and insures the weld joint will be sufficiently strong.

In a preferred embodiment of this invention, a bubble formed of a fluxing agent is placed at the tip of the portion of the stem which is to be consumed. The fluxing agent preferably ignites when the arc is formed between the bracket and the axle, and forms a high pressure, high temperature gas that initiates the welding process. The gas also cleans the area on the axle which is to receive the weld.

The bracket may be formed of any suitable material, and preferably is formed out of steel, stainless steel or an aluminum. The material of the axle is preferably also utilized to determine the preferred material for the bracket. Preferably, a material is chosen for the bracket which will have compatible welding characteristics with the axle.

These and other features of the present invention can be best understood from the following specification and drawings, the following of which is a brief description.

DETAILED DESCRIPTION OF A PREFERRED EMBODIMENT

Figure 1:
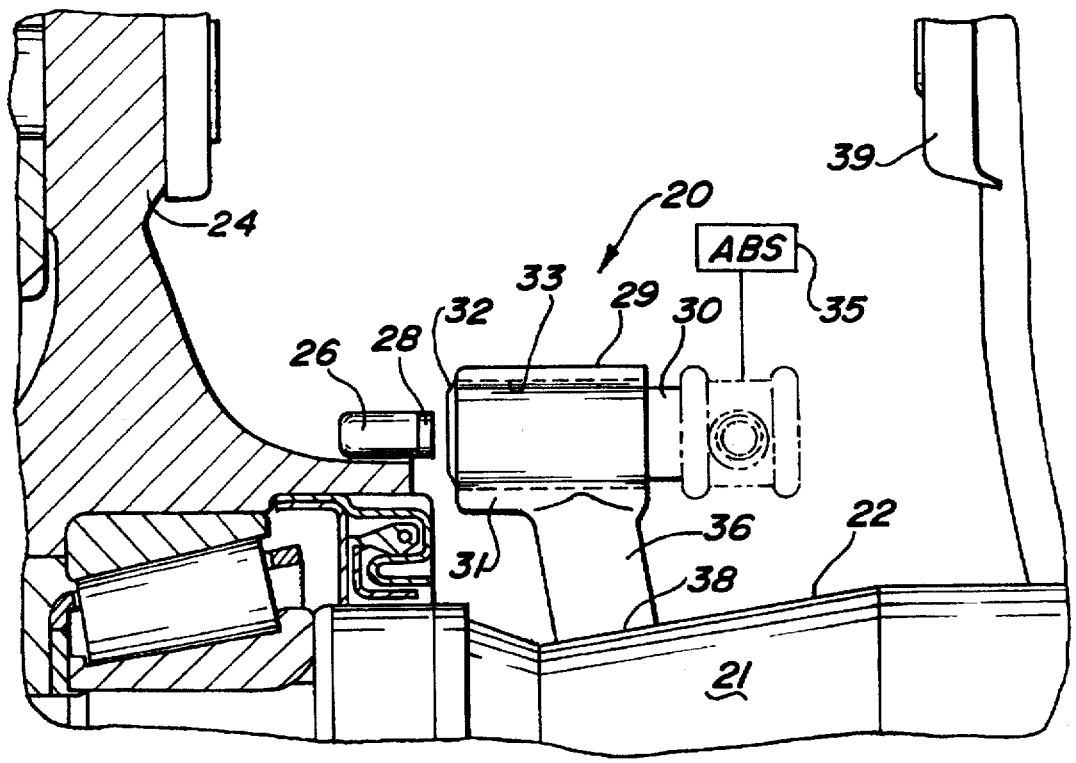
FIG. 1 is a view of a portion of a vehicle axle.
Figure 2:
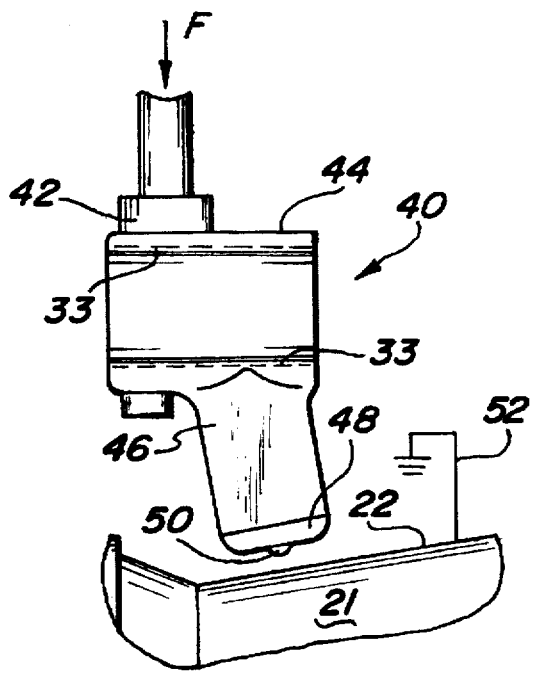
FIG. 2 shows a step in the connection of the bracket to the axle.

An axle assembly 20 is illustrated in FIG. 1 including an axle 21. Axle 21 has a frusto-conical or ramped portion 22. A wheel hub 24 is mounted to one end of the axle 21. A tone ring 26 includes a plurality of circumferentially-spaced serrations 28, only one of which is shown. A sensor bracket 29 mounts a sensor 30 in a barrel portion 31. Sensor 30 has a forward face 32 which monitors rotation of the wheel hub 24 by counting rotation of the serrations 28. The sensor 30 is mounted in a bore 33 in barrel 31. If the sensor 30 determines that the wheel hub 24 is not rotating, or is rotating at an unexpectedly low amount, the sensor 30 will send a signal to the anti-lock brake system, shown schematically at 35. Essentially, the anti-lock brake system compares rotation of the wheel hub to expected rotation. If the wheel is not rotating as expecting, the system determines that the wheel has locked.

A stem portion 36 of the bracket 29 is connected at a weld joint 38 to the frusto-conical portion 22 of the axle 21. As will be explained, the weld joint 38 is formed of a material that is consumed from an outer end of the stem 36. The stem 36 preferably extends at an angle that is non-perpendicular to the axis of the bore 33. A brake spider 39 is shown mounted adjacent to an opposed end of the sensor 30.

In mounting the bracket 29 to the axle 21, a bracket preform 40 is mounted in a fixture 42. Fixture 42 is shown schematically. A worker in the work transfer field would be able to design an appropriate fixture. Fixture 42 insures that a central axis of the bore 33 maintains a parallel relationship to the final desired relationship of the axis of the bore 33. A current source 44 is connected to provide a large current through the bracket preform 40. The current is of high amperage. It is expected to be generally on the order of 500 to 700 amps.

The stem 46 of the preform 40 includes an outer portion 48 which is to be consumed during the welding process. A bubble 50 is formed of a known fluxing agent at the outermost end of the outer portion 48. The portion 48 may be formed of the same material as the remainder of stem 46. Axle 21 is connected to ground 52. As the fixture 42 brings the bracket preform 40 toward axle 21, an arc is formed between the high amperage bracket preform 40, and the ground axle 21. The arc initially ignites the fluxing agent 50, and then turns the outer portion 48 turns into a molten material. This molten material forms the weld joint 38 as shown in FIG. 1. The fluxing agent 50 is of a known type which creates a high temperature high pressure gas that initiates the welding and cleans the area on the bracket 21 that is to receive the weld joint 38. As the fixture continues to move bracket preform 40 towards axle 21, outer portions the preform continues to become molten.

Preferably, the welding is completed in a time period of less than a few seconds. The connection to the current source 44 may be ended after the expiration of the desired weld time period. The exact weld time period necessary is determined experimentally to result in a bracket 29 which is mounted at a proper position relative to the tone ring 26. The desired weld time might vary with the material of the bracket preform 40, the dimensional relationships between the axle, the tone ring and the bracket, and also the amount of current supplied through source 44. As such, the invention includes the step of experimentally determining the time required for the weld, and then stopping the application of current after that time has expired. The weld time must be closely controlled to result in a satisfactory weld joint 38 and placement of bracket 29. The types of weld materials and the times and amounts of application of current to the bracket are well within the skill of a worker in the welding art.

Figure 3:
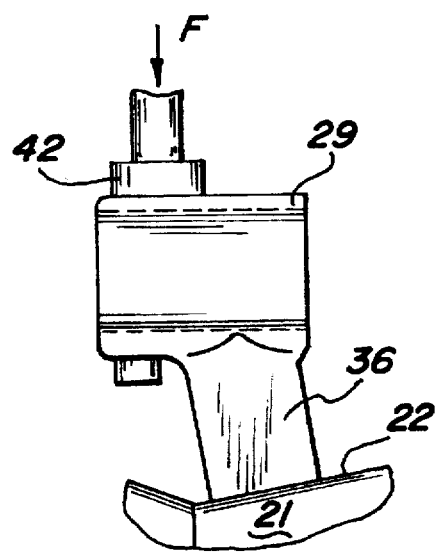
FIG. 3 shows a step subsequent to the step shown in FIG. 2.

FIG. 3 shows a final step in the welding of the bracket 40 to the axle 21, after the expiration of the predetermined weld time. Once the current is disconnected, the fixture 42 continues to apply a force F on bracket 29 holding it on frusto-conical portion 22 of axle 21. The molten material from portion 48 thus forms the weld joint 38. The bracket 29 is now fully secured to the axle 21. The sensor is then preferably mounted in the barrel.

Since the bracket preform 40 supplies the necessary welding material, the inventive method is easily adapted to automatic manufacturing. A fixture 42 could be developed which welds brackets to both ends of the axle 21 in a single step. The time and labor required to connect the brackets is thus greatly reduced over the prior art.

The exact details of the weld process are well within the skill of a worker of ordinary skill in the art. One preferred type of welding may be that known as stud welding. The bracket preform 40 may be optionally formed out of steel, stainless steel, aluminum, or other metal materials which will provide a good weld joint with the particular material of the axle 21. It is preferred that the bracket preform 40 (other than the fluxing agent bubble 50) be formed of a single material and a single part.

The use of the consumable preform to form the weld joint is particularly valuable since a strong weld must be provided. The bracket and the axle are subject to vibration, and other forces due to the location on the vehicle axle. The frusto-conical portion of the axle that receives the bracket makes it somewhat complex to provide a uniform amount of weld material from the prior art weld rod. Thus, given the location of the bracket on a frusto-conical portion, and also given the exact positioning of the barrel as necessary, the use of the consumable bracket of this invention provides a better weld that is relatively simple to properly achieve.

A preferred embodiment of this invention has been disclosed, however, a worker of ordinary skill in the art would recognize that certain modifications would come within the scope of this invention. For that reason, the following claims should be studied to determine the true scope and content of this invention.

We claim:

1. A method of attaching an anti-lock brake sensor bracket to a vehicle axle comprising the steps of:
   a. providing a bracket preform having a barrel with a structure for receiving a sensor, and a stem extending from said barrel, an outer end of said stem being formed of a material that will be consumed as said preform is welded to an axle, and providing an axle to be welded to said preform;
   b. providing a current through one of said bracket preform and said axle, and grounding the other of said bracket preform and said axle, and bringing said bracket preform and said axle close together such that an arc is formed between the two, and such that said consumable end of said stem is made molten; and
   c. holding said bracket preform adjacent to said axle such that said bracket preform becomes secured to said axle with said molten material forming a weld joint.

2. A method as recited in claim 1, wherein said axle is connected to ground, and said bracket preform is connected to a source of current.

3. A method as recited in claim 1, wherein said bracket preform is held in a fixture, and said fixture is moveable to move said bracket preform towards said axle, and then into contact with said axle.

4. A method as recited in claim 3, wherein the connection of said current is discontinued after a predetermined period of time, and said fixture continues to hold said bracket against said axle after the discontinuation of the application of said current.

5. A method as recited in claim 1, wherein a fixture holds a barrel portion of said bracket preform with a bore that is to mount said sensor, extending parallel to a desired axis as said bracket preform is brought near said axle.

6. A method as recited in claim 1, wherein said preform is welded to a frusto-conical portion of said axle.

7. A method as recited in claim 1, wherein a fluxing agent bubble is formed on an extreme end of said stem remote from said barrel, said fluxing agent initially igniting as said bracket is brought near said axle, said fluxing agent being selected to create a high temperature gas to clean a surface on said axle for receiving said bracket weld joint.

8. A method as recited in claim 1, wherein said bracket mounts a sensor which communicates with an anti-lock braking system.

9. A method of securing a sensor bracket to a vehicle axle comprising the steps of:
   a. providing a sensor bracket preform having a portion for holding a sensor and a stem extending from said portion, an end of said stem remote from said position being formed of a consumable material, and providing an axle, said axle having a frusto-conical portion to be welded to said stem;
   b. grounding said axle, and connecting said preform to a source of current;
   c. mounting said bracket in a fixture, and moving said bracket towards said axle such that an arc is created between said bracket and said axle, and said consumable portion of said bracket becomes molten;
   d. disconnecting said current supply after a predetermined period of time, and continuing to hold said bracket against said axle for a period of time after the discontinuation of said current to allow said bracket to be secured to said axle.

10. A method as recited in claim 9, wherein a fluxing agent bubble is formed on an extreme end of said stem remote from said barrel, said fluxing agent initially igniting as said bracket is brought near said axle, said fluxing agent being selected to create a high temperature gas to clean a surface on said axle for receiving said bracket weld joint.

11. A method as recited in claim 10, wherein said bracket mounts a sensor which communicates with an anti-lock braking system.

* * * * *